(12) United States Patent
Swidowski et al.

(10) Patent No.: US 9,589,132 B2
(45) Date of Patent: Mar. 7, 2017

(54) METHOD AND APPARATUS FOR HYPERVISOR BASED MONITORING OF SYSTEM INTERACTIONS

(71) Applicant: Barkly Protects, Inc., Boston, MA (US)

(72) Inventors: Kirk R. Swidowski, Manteca, CA (US); Ryan J. Berg, Austin, TX (US); Stephen C. Carlucci, Lunenburg, MA (US); John J. Danahy, Bow, NH (US)

(73) Assignee: Barkly Protects, Inc., Boston, MA (US)

( * ) Notice: Subject to any disclaimer, the term of this patent is extended or adjusted under 35 U.S.C. 154(b) by 0 days.

(21) Appl. No.: 15/095,607

(22) Filed: Apr. 11, 2016

(65) Prior Publication Data

US 2016/0224786 A1    Aug. 4, 2016

Related U.S. Application Data

(63) Continuation of application No. 15/069,253, filed on Mar. 14, 2016, which is a continuation-in-part of application No. 14/670,721, filed on Mar. 27, 2015.

(Continued)

(51) Int. Cl.
*G06F 9/455* (2006.01)
*G06F 21/53* (2013.01)
(Continued)

(52) U.S. Cl.
CPC .......... *G06F 21/53* (2013.01); *G06F 9/45558* (2013.01); *G06F 21/554* (2013.01); *G06F 21/563* (2013.01); *G06F 21/566* (2013.01); *H04L 63/1416* (2013.01); *G06F 2009/45587* (2013.01); *G06F 2009/45591* (2013.01);
(Continued)

(58) Field of Classification Search
None
See application file for complete search history.

(56) References Cited

U.S. PATENT DOCUMENTS

| | | | |
|---|---|---|---|
| 2014/0245444 A1* | 8/2014 | Lutas | G06F 12/109 726/24 |
| 2015/0101049 A1* | 4/2015 | Lukacs | G06F 21/566 726/23 |
| 2015/0121135 A1* | 4/2015 | Pape | G06F 11/1484 714/15 |

OTHER PUBLICATIONS

"Kernel Patch Protection"; https://en.wikipedia.org/wiki/Kernel_Patch_Protection; May 1, 2016; 7 pages.
(Continued)

*Primary Examiner* — Tammy Lee
(74) *Attorney, Agent, or Firm* — Davis, Malm & D'Agostine, P.C.

(57) ABSTRACT

A security system and method efficiently monitors and secures a computer to defend against malicious intrusions, and includes an in-band software monitor disposed within a kernel in communication with an operating system (OS) of the computer. The monitor intercepts system calls made from an MSR (Model Specific Register), to execute monitoring operations, and subsequently returns execution to the OS. An out-of-band hypervisor communicably coupled to the OS, has read shadow means for trapping read requests to the MSR, and write mask means for trapping write requests to the MSR. The hypervisor includes means for responding to the trapped read and write requests so that presence of the monitor is obscured.

12 Claims, 3 Drawing Sheets

Related U.S. Application Data

(60) Provisional application No. 62/267,255, filed on Dec. 14, 2015, provisional application No. 61/971,244, filed on Mar. 27, 2014.

(51) Int. Cl.
  H04L 29/06 (2006.01)
  G06F 21/56 (2013.01)
  G06F 21/55 (2013.01)

(52) U.S. Cl.
  CPC .......... *G06F 2221/034* (2013.01); *G06F 2221/2101* (2013.01); *H04L 63/1433* (2013.01); *H04L 63/1441* (2013.01)

(56) References Cited

OTHER PUBLICATIONS

"Bypassing PatchGuard on Windows x64"; Leviathan Security Group; https://static1.squarespace.com/static/556340ece4b086 9396f21099/t/55849886e4b0757859b3d534/1434753158190/uninformed_v3a3.pdf; Dec. 1, 2005; 1 page.

"Intel 64 and IA-32 Architectures Software Developer Manuals"; http://www.intel.com/content/www/us/en/processors/architectures-software-developer-manuals.html; May 1, 2016; 7 pages.

Garfinkel, T. and Rosenblum, M.; "A Virtual Machine Introspection Based Architecture for Intrusion Detection"; http://suif.stanford.edu/papers/vmi-ndss03.pdf; Computer Science Department, Stanford University, Stanford, California USA; white paper; 16 pages.

Payne, Bryan D.; "Simplifying Virtual Machine Introspection Using LibVMI"; http://prod.sandia.gov/techlib/access-control.cgi/2012/127818.pdf; Sandia National Laboratories; Albuquerque, New Mexico USA; Sep. 2012; 20 pages.

Pfoh, J. et al.; "Nitro: Hardware-based System Call Tracing for Virtual Machines"; https://www.sec.in.tum.de/assets/staff/pfoh/PfohSchneider2011a.pdf; Technische Universitat Munchen, Munich, Germany; white paper; Nov. 2011; 18 pages.

"ARMv8—A Reference Manual"; http://infocenter.arm.com/help/topic/com.arm.doc.ddi0487a.g/index.html; Beta; ARM; 2013; 5158 pages.

\* cited by examiner

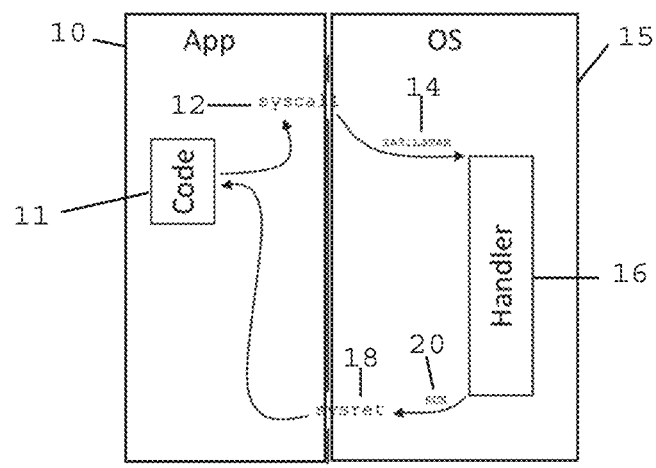
Figure 1 (Prior Art): App/OS System Call
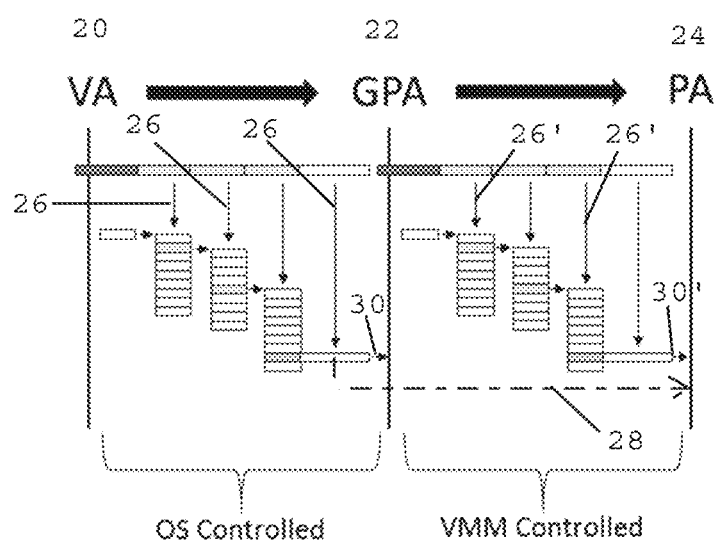
Figure 2    Translation from VA --> PA with EPT

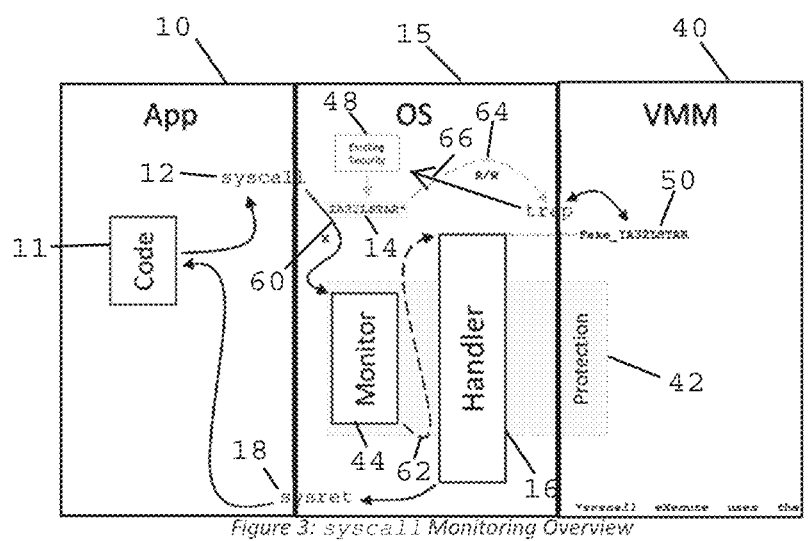
Figure 3: syscall Monitoring Overview

METHOD AND APPARATUS FOR HYPERVISOR BASED MONITORING OF SYSTEM INTERACTIONS

RELATED APPLICATION

This application claims priority, and is a continuation of co-pending U.S. patent application Ser. No. 15/069,253, entitled Method and Apparatus for Hypervisor Based Monitoring of System Interactions, filed on Mar. 14, 2016, which claims the benefit of U.S. Provisional Patent Application Ser. No. 62/267,255, entitled Method and Apparatus for Efficiently Monitoring System Interactions, filed on Dec. 14, 2015, and which is a Continuation-In-Part of co-pending U.S. patent application Ser. No. 14/670,721, entitled Malicious Software Identification Integrating Behavioral Analytics and Hardware Events, filed on Mar. 27, 2015, which claims the benefit of U.S. Provisional Patent Application Ser. No. 61/971,244, entitled Computer Security System and Method, filed on Mar. 27, 2014, the contents all of which are incorporated herein by reference in their entirety for all purposes.

BACKGROUND

Technical Field

This invention relates to computer system security, and more particularly, to a system and method for efficiently monitoring and securing a computer using an in-band monitor to intercept system calls, and using an out-of-band hypervisor to trap and respond to read and write requests of the CPU register(s) responsible for describing where control flow is transferred to when a system call is executed.

Background Information

Modern Operating Systems (OSs) manage the interaction between applications and resources of a system to facilitate efficient sharing as well as ensure overall stability and security. The OS component that performs these tasks is referred to as the kernel. It, among other things, schedules applications and processes resource requests. In order to do this, there is a mechanism, known as a system call, that signals the OS when an application desires access to a resource. A system call has a well-defined interface, and regardless of what an application is looking to do, it must conform to this definition in order to successfully communicate requests to the OS. Examples of these resources that leverage the system call interface are the file system, the network, the display, and the registry.

Because of its central role, security researchers, both offensive and defensive, understand that co-opting this interface has many benefits: For an attacker it can be used to provide stealth, hide files, processes, network sockets, and other resources so neither user nor security application can detect their presence. For a defender, manipulating this interface enables pervasive monitoring and can restrict access to resources. In the past, the common approach for attaching to this interface was through Direct Kernel Object Manipulation (DKOM). For example, on older Windows OSs (e.g. Windows XP 32-bit), function pointers in the System Service Descriptor Table (SSDT) would be replaced, thereby changing the behavior of the function when called. With concern over stability and compatibility, because multiple entities could hook and unhook the same entries, and anxiety over the legitimacy of performing these types of kernel changes, Microsoft introduced a technology known as PatchGuard™ (Microsoft Corporation, Redmond, Wash.).

PatchGuard operates in the context of the OS kernel and at certain points in time will verify the state of security critical objects (e.g. EPROCESS list and SSDT) and registers (e.g. Extended Features Enable Register Model Specific Register [MSR] and IDTR). (Model-specific registers (MSRs) are control registers provided by processor implementations to provide system software with features that are provided on specific processor implementations, but not others. Extended Feature Enable Register (EFER) is a register added to enable SYSCALL/SYSRET instruction.) When it notices a modification it triggers a fault, known as a "Blue Screen of Death (BSoD)" which will abort the current operation of the system and cause a system reboot. While this technology can be bypassed, it makes it much more difficult for attackers to install persistent rootkit style malware and has forced defensive security organizations to use other, "approved", methods to implement their monitoring technologies. These "approved" methods, however, only provide a subset of the monitoring capabilities afforded through DKOM, such as modifying the SSDT. As an example, the "approved" methods allow for monitoring the registry, file system, network and process creation/destruction events but lack the ability to see other fundamental process interactions, such as calls to modify regions of a remote application's address space. The result is that modern monitoring capabilities are less robust than their pre-PatchGuard counterparts, and are insufficient for some forms of monitoring.

Thus, a need exists for improved monitoring capabilities that address the aforementioned drawbacks.

SUMMARY

The appended claims may serve as a summary of the invention. Moreover, according to one aspect of the invention, a security system for efficiently monitoring and securing a computer to defend against malicious intrusions, includes an in-band software monitor disposed within a kernel in communication with an operating system (OS) of the computer, the monitor configured to intercept system calls made from an MSR (Model Specific Register) of the processor, to execute monitoring operations, and to subsequently return execution to the OS. An out-of-band hypervisor communicably coupled to the OS, has read shadow means for trapping read requests to the MSR, and write mask means for trapping write requests to the MSR. The hypervisor has means for responding to the trapped read requests and trapped write requests so that presence of the monitor is obscured.

Another aspect of the invention a method for efficiently monitoring and securing a computer, to defend against malicious intrusions, includes intercepting, with an in-band software monitor disposed within a kernel in communication with an operating system (OS) of the computer, system calls made from an MSR (Model Specific Register). The monitor is then used to execute monitoring operations, after which execution is returned to the OS. A read shadow means of an out-of-band hypervisor communicably coupled to the OS, traps read requests to the MSR, and a write mask means of the out-of-band hypervisor, traps write requests to the MSR. The hypervisor responds to the trapped read requests and trapped write requests, so that presence of the monitor is obscured.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The present invention is illustrated by way of example and not limitation in the figures of the accompanying drawings, in which like references indicate similar elements and in which:

FIG. 1 is a functional block diagram illustrating operation of computer system of the prior art;

FIG. 2 is a graphical illustration of instruction translation used in embodiments of the present invention;

FIG. 3 is a functional block diagram of an aspect of operation of embodiments of the present invention.

DETAILED DESCRIPTION

Figure 4:
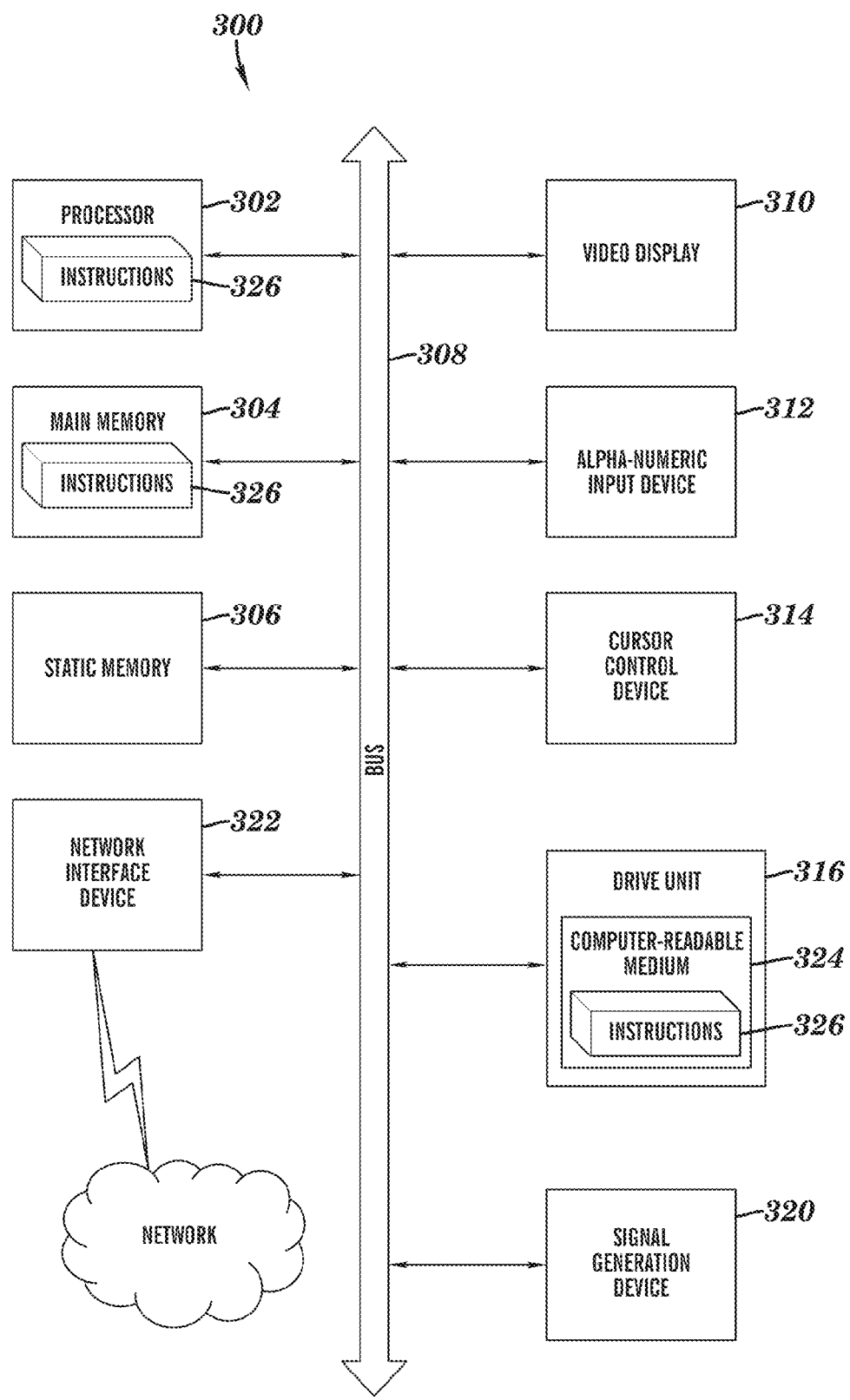
FIG. 4 is a block diagram of one embodiment of a computer system in which embodiments of the present invention may be employed.

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. In addition, well-known structures, circuits and techniques have not been shown in detail in order not to obscure the understanding of this description. The following detailed description is, therefore, not to be taken in a limiting sense, and the scope of the present invention is defined by the appended claims and their equivalents.

As used in the specification and in the appended claims, the singular forms "a", "an", and "the" include plural referents unless the context clearly indicates otherwise. For example, reference to "an analyzer" includes a plurality of such analyzers. In another example, reference to "an analysis" includes a plurality of such analyses.

Although specific terms are employed herein, they are used in a generic and descriptive sense only and not for purposes of limitation. All terms, including technical and scientific terms, as used herein, have the same meaning as commonly understood by one of ordinary skill in the art to which this invention belongs unless a term has been otherwise defined. It will be further understood that terms, such as those defined in commonly used dictionaries, should be interpreted as having a meaning as commonly understood by a person having ordinary skill in the art to which this invention belongs. It will be further understood that terms, such as those defined in commonly used dictionaries, should be interpreted as having a meaning that is consistent with their meaning in the context of the relevant art and the present disclosure. Such commonly used terms will not be interpreted in an idealized or overly formal sense unless the disclosure herein expressly so defines otherwise.

Terminology

As used herein, the term "computer" is meant to encompass a workstation, personal computer, personal digital assistant (PDA), wireless telephone, or any other suitable computing device including a processor, a computer readable medium upon which computer readable program code (including instructions and/or data) may be disposed, and a user interface. Terms such as "application", "engine" and the like are intended to refer to a computer-related component, including hardware, software, and/or software in execution. For example, an engine may be, but is not limited to being, a process running on a processor, a processor including an object, an executable, a thread of execution, a program, and a computer. Moreover, the various components may be localized on one computer and/or distributed between two or more computers.

Programming Languages

The system and method embodying the present invention can be programmed in any suitable language and technology, such as, but not limited to: Assembly Languages, C, C++; Visual Basic; Java; VBScript; Jscript; Node.js; BCMAscript; DHTM1; XML and CGI. Alternative versions may be developed using other programming languages including, Hypertext Markup Language (HTML), Active ServerPages (ASP) and Javascript. Any suitable database technology can be employed, such as, but not limited to, Microsoft SQL Server or IBM AS 400.

Referring now to the Figures, embodiments of the present invention will be described in detail. This specification describes means for regaining the type of control that makes monitoring, detection, and protection, more effective. Before going into those details, it is helpful to describe features of the Intel (Intel Corporation, Santa Clara, Calif.). One feature describes the means through which an OS and an application communicate, showing how the CPU transfers control between them. Intel CPUs that support IA-32e or 64-bit mode introduce two new instructions, syscall and sysret to the Instruction Set Architecture (ISA) and a few new MSRs, like IA32STAR and IA32LSTAR. The syscall instruction is used by an application to transfer context to the OS and sysret is used to return execution from the OS to an application. The IA32STAR MSR holds the value loaded into the Code Segment (CS) register and the IA32LSTAR MSR holds the value loaded into the Register Instruction Pointer (RIP) (a processor register that indicates where a computer is in its program sequence) which defines where execution will be passed to upon execution of the syscall instruction. (The physical address is calculated from 2 parts: i) segment address; ii) offset address. The CS is used to address the code segment of the memory i.e., a location in the memory where the code is stored. The RIP contains the offset within the code segment of the memory. Hence CS:IP is used to point to the location (i.e to calculate the physical address) of the code in the memory.) RCX holds the address that execution will return to when sysret is executed (see FIG. 1). Other modes of execution provide similar mechanisms to build this interface (e.g. 32-bit protected mode uses sysenter and sysexit or the int instruction).

Referring specifically to FIG. 1, starting from the left, an application 10 is executing some software ("Code") 11. At some point, it wants to make a request to the operating system 15 (via OS Handler 16) for a particular resource, e.g., to open a file, or to access the network. Within the Code 11, various high level APIs are called in order to access particular functions, e.g., an open file function may be called by the software application. In this particular example, regardless of what APIs are called, by the time control is transferred over to the OS to request the service, a low level instruction referred to as a system call (syscall) is executed. Syscall, shown at 12, is an x86 instruction defined by Intel. When this system call is executed, the cpu looks at the hardware, to read a particular register (e.g., IA32LSTAR, as shown at 14), which specifies where execution gets passed to. In this example, the IA32LSTAR register 14 points to the entry point of the OS handler 16. Once execution is passed to it, the OS handler looks at the resources it has available, to decide whether or not it's going to fulfill its access request, etc. Execution of the OS Handler 16 proceeds until the system return (sysret) instruction 18 is called, which reads the RCX register 20. The RCX register stores the address in the Code 11 to which execution is to be returned.

Referring now to FIG. 2, as the techniques presented herein leverage aspects of system virtualization, it is also helpful to introduce a limited number of those features. Extended Page Table (EPT) facilities, enable embodiments of the invention to provide an additional layer of address translation. Instead of an address translating directly from a Virtual Address (VA) 20 to a Physical Address (PA) 24 (FIG. 2), embodiments of the invention provide an intermediate step in which the Virtual Address 20 is first translated into a Guest Physical Address (GPA) 22, and is then resolved to the Physical Address (PA) 24.

To describe this concept further, normally, when a program executes, it reads and writes virtual addresses. In a conventional system that does not include a hypervisor (VMM) 40 (FIG. 3), a memory management unit essentially translates from virtual address 20 straight to a physical address 24, as shown by downward pointing arrows 26 and dashed arrow 28.

Embodiments of the present invention include a hypervisor (VMM) 30 (FIG. 3), and a first layer of translation that is similar to that described above. The operating system wants to be able to translate virtual addresses to something it views as physical addresses, because the OS is configured for managing hardware. So when the hypervisor (VMM) 40 is added to these embodiments, the operating system effectively controls a virtual address's translation to guest physical address (GPA) 22, as shown by arrows 26 and 30. The VMM 40 then translates the GPA 22 to PA 24 as shown by arrows 26' and 30'. The OS thus views the GPA as a real physical address, even though the GPAs are effectively another layer of virtual addresses.

It is noted that hypervisor 40 is configured to run multiple virtual machines (VMs), each of which may be attempting to translate from VA 20 to GPA 22. This EPT translation approach, in which the hypervisor 40 controls translation from GPA 22 to physical address (PA) 24, enables the hypervisor to maintain control over the real hardware and provide mapping and isolation between VMs. This structure also enables the hypervisor to modify permissions and attributes to make things invisible from inside an operating system, to protect memory, etc., as will be discussed in greater detail below.

These embodiments thus provide a modified EPT approach for layered translation in which the OS manages a layer of translation from VA 20 to GPA 22, and a Virtual Machine Monitor (VMM or 'hypervisor') 40 (FIG. 3) manages a layer of translation from the resulting GPA 22 to the PA 24. Each layer also has the ability to set attributes and permissions. This provides a VMM with the indirection required to manage and isolate memory from Virtual Machines (VMs). Furthermore, Intel's implementation of EPT provides the ability to set memory as executable but not readable. This means the processor can execute instructions from a page without having the ability to perform data accesses. If a data access is attempted, an EPT violation occurs and execution is passed to the VMM.

Another feature leveraged by embodiments of the present invention involves the "trapping" of Model Specific Registers (MSRs). A "trap" is an event generated by the CPU when it attempts a particular operation, and which results in control being passed to a handler, usually in the OS 15 or VMM 40 where some additional behavior can be performed. In this way, a trap allows VMM 40 to intercept execution whenever less privileged software, like the OS, tries to access an MSR of interest. For example, a hypervisor could register to receive notification when a Virtual Machine (VM) tries to read or write the IA32LSTAR MSR 14 (FIG. 1). This may be useful if it wanted to detect changes to the location that the syscall instruction 12 transfers execution to. If the notification is of an attempt to read, then the hypervisor can return the MSR's actual state, or it can instead provide a modified or emulated version. If the operation is an attempt to write, the hypervisor has the opportunity to modify, block or emulate that write.

The instant inventors have realized that as virtualization informs and mediates the behavior of the OS, it is in a prime position to inspect actions of the OS while remaining isolated from it. There has been much research performed in the area of VM-Introspection, which is the act of peering into the context of the OS to understand fundamental information such as the state of processes and threads. Most of this work has remained academic, as inefficient introspection has a tremendous negative impact on performance due to continuous translation and the prevalence of unnecessary trapping. Furthermore, some of this research has also reduced system stability through incorrectly constructed accesses of undocumented application and OS data structures. For these reasons, the techniques and their resulting implementations continue to evolve as academic exercises. In contrast, the embodiments shown and described herein demonstrate how a hypervisor may be used to efficiently monitor and augment system call activity with minimal, if any, adverse impact on performance or stability.

The instant inventors have recognized that traditional OS only based monitoring solutions are no longer useful in many applications due to the inclusion of kernel based self-monitoring capabilities such as discussed hereinabove. The act of monitoring interactions from within the context of involved parties, without fortifying it in some way, is faulty by design. This is because a compromise of either party will render the monitoring it includes effectively useless. The present inventors have recognized that leveraging a VMM for fortification of a monitoring technology, while still allowing the monitor itself to co-exist in an involved party, is an ideal solution in many applications because of the retained efficiency of running in the context of the party, and the VMM can provide fortification. Furthermore, the hypervisor can provide a level of transparency so that if malicious software does compromise the context in which the monitor operates, the malicious software may be unable to directly detect the presence of the monitor.

It is noted that embodiments shown and described herein, unlike other approaches of monitoring the syscall interface with a hypervisor, do not require the enumeration of ordinarily undocumented data and structures, and do not require access to the OS source code, both of which are unrealistic in many applications and effectively make these other approaches impractical.

In the following subsections, a new approach is described which enables system call monitoring without the performance, stability, and source code issues present in prior work. It also describes additional functionality that is necessary to render the invention deployable on real-world systems. These embodiments employ "syscall Monitoring", which is an approach used to gain execution before control has been passed to the OS. This approach monitors application call parameters and blocks application activity. The techniques presented do not require source code of the OS and may be dynamically installed and uninstalled.

System Call Monitoring

System Call (syscall) monitoring is the act of gaining execution, in some context, before an application can successfully pass its tasking to the OS. As these interactions occur with great frequency the desired technique must ensure a minimal performance impact on the activity. As systems become busier and more strained, there is usually a corresponding increase in the volume of syscall activity. As a result it is generally unacceptable to trap to any out-of-band monitor when trying to meet tight performance constraints. For this reason the approach described here leverages the facilities of a VMM in an indirect fashion. This embodiment of the invention leaves the state of the system, as seen from the context of the OS, in an unaltered state. This ensures that existing security technologies, such as Microsoft's PatchGuard™, are not triggered by the introduction of the monitoring capability, and it also helps ensure that offensive software cannot detect its presence. An overview of the approach is presented in FIG. 3.

Referring now to FIG. 3, embodiments of the present invention effectively gain control of execution inside the context of the operating system without the operating system seeing any modifications. This is important for existing security technologies, such as PatchGuard. As discussed above, PatchGuard, and similar tools, operates inside the OS in the kernel to effectively verify the state of various aspects of system to make sure a root kit or a monitoring technology isn't doing things it shouldn't, such as attempting to modify or set a particular function pointer. If it does detect such an attempt, PatchGuard may respond by effectively crashing the system. Embodiments of the invention have been configured to be substantially transparent to the OS, both to keep PatchGuard, and the like, from crashing the system, and to help ensure that an attacker will not be able to observe the Monitor inside the operating system and thus be alerted to the presence of monitoring technology.

As shown, code 11 of software application 10 is making a request for a resource from the OS 15, which executes system call 12 as discussed above with respect to FIG. 1. The system call 12 passes execution to an address stored in hardware register IA32LSTAR 14. In particular embodiments, a Protection Box shown at 42 updates the IA32LSTAR to point to monitor code 44 that has been loaded into the OS. Thereafter, execution is intercepted and passed at 60 to the monitor whenever the code 11 calls the system call 12. After the monitor code has finished executing its various system monitoring operations, execution is passed at 62 to the OS Handler 16, as shown, which then operates in a conventional manner. Once the Handler's operation in completed, the sysret 18 is called to return execution to the application Code 11. It should be noted that monitor code 44 may perform any number of monitoring operations to monitor operation of the OS and the system upon which the OS is running, as would be familiar to those skilled in the art.

As also shown, Existing Security 48 is a technology such as the above-referenced PatchGuard, which reads the IA32LSTAR register to be sure it's pointing to the proper location, such as to the top of a particular handle or block, e.g., to the top of the OS Handler 16. Embodiments of the invention are configured to trap the attempted read (the "read shadow" as discussed below) of the IA32LSTAR to the hypervisor as shown at 64. The hypervisor contains a substitute value ("fake IA32LSTAR", "Substitute IA32LSTAR", or "Substitute MSR") value 50, which is returned (the "write mask" as discussed below) to the Existing Security 48 at 66. That way, existing security products read what the hypervisor wants to tell it, e.g., it still points to the OS Handler code 16 rather than to the monitor 44.

So even though execution is passed to the monitor 44, PatchGuard 48 can't actually see that any modification to the IA32LSTAR register occurred. About the only way to see that modification did occur to that register is to actually step through the system call instruction itself with a debugger, which would start execution at the Monitor 44 instead of directly at the OS handler or leverage the CPU's performance monitoring capabilities.

Moreover, the Protection Box shown extending from the Monitor 44 to the VMM (hypervisor) 40 is the Extended Page Table (EPT) facility shown and described with respect to FIG. 2. As described, the EPT is used to protect the Monitor code 44 within the OS 15. So even though the monitor code is inside the OS, the EPT may be updated, such as to mark the Monitor code as 'read only'. The OS 15 can't manipulate the EPT 42 because the EPT is controlled by the hypervisor (VMM) 40, even though the monitor may exist inside the context of the OS. It should be noted that this approach helps ensure that any other software, malicious or good, that runs in the context of the OS can't effectively see the Monitor or remove it.

It should also be noted that these embodiments do not trap to the hypervisor on every system call interaction because it's too expensive. System call interactions happen thousands upon thousands of times per second. As system load goes up, more of these requests come in, which therefore gets expensive in terms of computational resources. The instant embodiments reduce this expense. It should be noted that in these embodiments, when an application (Code) executes a system call instruction, execution is still passed to the OS, i.e., execution is ultimately passed to the OS handler after operation of the Monitor. There's no direct trapping to the hypervisor on these very frequent events. The system only provides indirect trapping to the hypervisor, e.g., when PatchGuard tries to read the IA32LSTAR register, which is relatively infrequent. In addition, if an attempt was made to modify or access the Monitor's memory, the system would trap to the hypervisor. (The attempted data access would be an EPT violation as discussed above, with execution being passed to the VMM.) These embodiments have effectively limited the need to actually trap to the hypervisor to tasks that are infrequent. The path that occurs relatively frequently, namely, system call interaction, occurs without requiring additional trapping to the hypervisor. Thus, in this approach, the primary impact on processing overhead is simply the processing of the Monitor code itself. This is a notable distinction relative to conventional approaches that trap directly from system call instruction to a hypervisor, and then jump back into the OS, creating a relatively high overhead burden due to the repeated switching back and forth between these modes of execution.

Thus, in these embodiments, the role of the hypervisor is to provide a read shadow and write mask over IA32LSTAR 14 and protect the monitoring code and data (i.e., the Monitor 44) that has been added to the OS 15, as discussed below. The term "read shadow" means that when a VM reads the contents of a register the VMM will read a value different than the state in the CPU. The term "write mask"

means that when a VM writes the contents of a register the VMM will write a value different than requested into the CPU.

These embodiments do not directly intercept syscall interactions. The software responsible for actively monitoring interactions (i.e., the Monitor 44) is contained in the OS 15 itself, and therefore, in particular embodiments, may require additional protection to ensure its operation and integrity, as mentioned above. For example, in particular embodiments, upon installation, monitor 44 communicates the following information to the hypervisor (VMM) 40:
 1. monitor base address and size in memory
 2. monitor entry point address
 3. state of the IA32LSTAR MSR 14

In response the hypervisor 40 will:
 1. protect the region of memory associated with the monitor (e.g. using Intel EPT and Intel VT-d)
 2. saves IA32LSTAR to a variable (i.e. Fake_IA32LSTAR in FIG. 3)
 3. update the IA32LSTAR MSR with the monitor entry point address If at any point the monitor wishes to be removed the steps above are reversed, which will restore the system to its unmonitored state.

The rationales for this additional innovation are these:
 1. The requirement to implement a read shadow over the IA32LSTAR MSR is needed to ensure that existing security software are not tripped. For example, PatchGuard occasionally verifies this MSR and would BSoD if it saw the modification.
 2. The write mask ensures that other software can not relocate or intermediate the execution of monitor 44; thus helping to prevent malware from gaining a pre-process position to monitor 44 in the context of the OS. This approach also helps to ensure stability as conventional hooking may present issues when a particular monitor wishes to be dynamically removed.

After the monitor has communicated the installation information it will gain execution on every execution of the syscall instruction. The performance impact is low because it is already running in the context of the OS. The cost is just the time taken to execute instructions associated with monitoring. In addition, the monitor doesn't need to perform expensive address translations because it is executing in the correct context and can simply directly dereference pointers. It should be noted that the monitor would verify the integrity of the pointer before dereferencing it.

With the monitor 44 running in the context of the OS 15, the hypervisor 40 provides additional protection to ensure that offensive code running at the same privilege level cannot circumvent it. The syscall instruction 12 already provides guarantees in hardware that the monitor 44 will be given control when executed, so the next requirement is to ensure that memory associated with the monitor can't be tampered with. This is accomplished by leveraging EPT to mark the code and data associated with the monitor as read-only and/or as executable, as discussed hereinabove, e.g., to protect against unauthorized CPU initiated memory transactions. It should be noted that a conventional memory management unit (MMU), e.g., an IOMMU (Input-Output MMU) may also be used to protect against device initiated memory transactions. Moreover, if the CPU's EPT implementation supports execute-only permissions, the monitor code 44 is marked accordingly, ensuring that no process in the OS can detect the monitor's presence via code signature scanning, to effectively hide the Monitor.

This approach may be used on substantially any operating system, e.g., Linux, Windows, different versions of Linux, different versions of Windows, including embedded versions.

While the techniques presented here focus on how a new and robust form of monitoring is achieved on the Intel x86 architecture it should be noted that substantially any CPU architecture that exhibits the following features is capable of implementing this solution:
 1. the Instruction Set Architecture (ISA) provides a mechanism to transfer execution between application and OS
 2. the location that gains execution upon transfer to the OS is modifiable and can be shadowed and masked by a higher privilege level
 3. CPU provides the ability to make memory executable, readable but not writeable while executing within the OS
 4. return address of a system interaction can be made to induce a trap As an example, Mobile (e.g. Apple iPhone 6, Samsung Galaxy S5 and Microsoft Lumia 735) and Internet of Things (IoT) devices leverage ARM [7] System on Chips (SoCs) and meets the requirements with the following features:
 1. usage of the SWI instruction to communicate between application and OS;
 2. inclusion of the VBAR_elx register to change the location of where SWI passes execution to in the OS;
 3. virtualization provides the ability to trap on VBAR_elx read/write events (e.g. MSR and MRS instructions in ARMv8);
 4. Stage 2 (S2) page tables can enforce executable, readable but not writeable permissions (Note that alternatives to S2, such as Shadow Paging or a vTLB may be used to implement the functionality of these embodiments, however S2 is far more efficient); and
 5. the return address is stored in ELR_elx and can be forced to trap by adjusting the address to cause a fault.

The embodiments hereof may be similarly implemented on x86 AMD CPUs and x86 CPUs running in 32-bit mode, and adaptation of the embodiments shown and described herein to such machines would be well understood by those skilled in the art in view of the instant disclosure.

The embodiments discussed herein focus on the application 10 to OS 15 interface, but this solution can be applied to other standardized interfaces, such as the Virtual Machine (VM) to Virtual Memory Manager (VMM) interface, where a VM utilizes para-virtualization or another Virtual Machine Interface (VMI) to communicate with a hypervisor. (A VM in this scenario may be a conventional OS or a nested hypervisor.)

Moreover, the techniques presented herein should be considered OS-agnostic and not specific to Microsoft Windows. The examples used Windows as an exemplary OS but as everything presented is architectural in nature these types of monitoring capabilities could easily be used on Linux, Android, Apple OS X, Apple iOS or Windows Phone.

FIG. 4 shows a diagrammatic representation of a machine in the exemplary form of a computer system 300 within which a set of instructions, for causing the machine to perform any one of the methodologies discussed above, may be executed. In alternative embodiments, the machine may include a network router, a network switch, a network bridge, Personal Digital Assistant (PDA), a cellular telephone, a web appliance or any machine capable of executing a sequence of instructions that specify actions to be taken by that machine.

The computer system 300 includes a processor 302, a main memory 304 and a static memory 306, which communicate with each other via a bus 308. The computer system 300 may further include a video display unit 310 (e.g., a liquid crystal display (LCD), plasma, cathode ray tube (CRT), etc.). The computer system 300 may also include an alpha-numeric input device 312 (e.g., a keyboard or touchscreen), a cursor control device 314 (e.g., a mouse), a drive (e.g., disk, flash memory, etc.) unit 316, a signal generation device 320 (e.g., a speaker) and a network interface device 322.

The drive unit 316 includes a computer-readable medium 324 on which is stored a set of instructions (i.e., software) 326 embodying any one, or all, of the methodologies described above. The software 326 is also shown to reside, completely or at least partially, within the main memory 304 and/or within the processor 302. The software 326 may further be transmitted or received via the network interface device 322. For the purposes of this specification, the term "computer-readable medium" shall be taken to include any medium that is capable of storing or encoding a sequence of instructions for execution by the computer and that cause the computer to perform any one of the methodologies of the present invention, and as further described hereinbelow.

The present invention has been described in particular detail with respect to various possible embodiments, and those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible, non-transitory, computer readable storage medium, such as, but is not limited to, any type of disk including floppy disks, optical disks, CD-ROMs, magnetic-optical disks, read-only memories (ROMs), random access memories (RAMS), EPROMs, EEPROMs, magnetic or optical cards, application specific integrated circuits (ASICs), any other appropriate static, dynamic, or volatile memory or data storage devices, or other type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

It should be further understood that any of the features described with respect to one of the embodiments described herein may be similarly applied to any of the other embodiments described herein without departing from the scope of the present invention.

Having thus described the invention, what is claimed is:

1. A security system for efficiently monitoring and securing a computer including a memory and processor, to defend against malicious intrusions, the system comprising:

an in-band software monitor disposed within a kernel in communication with an operating system (OS) of the computer, the in-band software monitor configured to intercept system calls made from an MSR (Model Specific Register) of the processor, to execute monitoring operations, and to subsequently return execution to the OS;

an out-of-band hypervisor communicably coupled to the OS, the hypervisor having read shadow means for trapping read requests to the MSR, and write mask means for trapping write requests to the MSR;

the hypervisor having means for responding to the trapped read requests and trapped write requests;

wherein the in-band software monitor comprises a monitor program stored on the memory and executable by the processor, the monitor program configured to:

receive system calls;

execute system monitoring operations;

forward the in-band software monitor's base address and size in memory to the hypervisor;

forward the in-band software monitor's entry point address to the hypervisor; and forward a state of the MSR to the hypervisor.

2. The system of claim 1, wherein the hypervisor comprises a hypervisor program stored on the memory and executable by the processor, the hypervisor program configured to:

mark the monitor program and data associated with the in-band software monitor as read-only and/or as executable-only, using one or more extended page table (EPT) entries and/or input-output memory management unit (IOMMU) entries;

save the state of the MSR to a substitute MSR; and update the MSR with the in-band software monitor's entry point address.

3. The system of claim 1, wherein the read shadow means comprises:

a substitute MSR containing substitute state information, the substitute state information being different than the state information contained in the MSR; and software stored on the memory and executable by the processor, configured to:

capture read requests of the MSR; and responsive to the captured read requests, return the substitute state information from the substitute MSR.

4. The system of claim 1, wherein the write mask means comprises:

a substitute MSR containing substitute state information, the substitute state information being different than the state information contained in the MSR; and software stored on the memory and executable by the processor, configured to:

capture write requests to the MSR; and responsive to the captured write requests, write the substitute state information from the substitute MSR to the MSR.

5. The system of claim 1, further comprising one or more extended page table (EPT) configured to translate virtual addresses (VAs) generated by the OS to guest physical addresses (GPAs), and to resolve the GPAs to physical addresses (PAs) of the computer, the EPT being further configured to mark the software and data associated with the in-band software monitor as read-only and/or as executable-only, wherein the presence of the in-band software monitor is obscured from detection by code signature scanning.

6. The system of claim 1, wherein the MSR comprises an IA32LSTAR register.

7. A method for efficiently monitoring and securing a computer including a memory and processor, to defend against malicious intrusions, the method comprising:

a) intercepting, with an in-band software monitor disposed within a kernel in communication with an operating system (OS) of the computer, system calls made from an MSR (Model Specific Register) of the processor, wherein the in-band software monitor comprises a monitor program stored on the memory and executable by the processor;

(b) executing, after said intercepting (a), monitoring operations with the in-band software monitor;

(c) returning, after said executing (b), execution to the OS;

(d) trapping, with read shadow means of an out-of-band hypervisor communicably coupled to the OS, read requests to the MSR;

(e) trapping, with write mask means of the out-of-band hypervisor, write requests to the MSR;

(f) responding, with the hypervisor, to the trapped read requests and trapped write requests; and (g) the monitor program:

receiving system calls;

executing system monitoring operations;

forwarding the in-band software monitor's base address and size in memory to the hypervisor;

forwarding the in-band software monitor's entry point address to the hypervisor; and forwarding a state of the MSR to the hypervisor.

8. The method of claim 7, wherein the hypervisor comprises a program stored on the memory and executable by the processor, the method further comprising the hypervisor program:

marking the monitor program and data associated with the in-band software monitor as read-only and/or as executable-only, using one or more extended page table (EPT);

saving the state of the MSR to a substitute MSR; and updating the MSR with the in-band software monitor's entry point address.

9. The method of claim 7, wherein the read shadow means includes software stored on the memory and executable by the processor, the method further comprising the read shadow means:

capturing read requests of the MSR; and responsive to the captured read requests, returning substitute state information from a substitute MSR, the substitute state information in the substitute MSR being different than the state information contained in the MSR.

10. The method of claim 7, wherein the write mask means software stored on the memory and executable by the processor, the method further comprising the write shadow means:

capturing write requests to the MSR; and responsive to the captured write requests, writing the substitute state information from a substitute MSR to the MSR, the substitute state information in the substitute MSR being different than the state information contained in the MSR.

11. The method of claim 7, further comprising using one or more extended page table (EPT) to translate virtual addresses (VAs) generated by the OS to guest physical addresses (GPAs), and to resolve the GPAs to physical addresses (PAs) of the computer, and marking the software and data associated with the in-band software monitor as read-only and/or as executable-only, wherein the presence of the in-band software monitor is obscured from detection by code signature scanning.

12. The method of claim 7, wherein the MSR comprises an IA32LSTAR register.

* * * * *